(12) United States Patent
Zhu et al.

(10) Patent No.: US 9,903,788 B2
(45) Date of Patent: Feb. 27, 2018

(54) ELECTROACTIVE POLYMER-BASED FLOW SENSOR AND METHODS RELATED THERETO

(75) Inventors: Guoming G Zhu, Novi, MI (US); Xiaobo Tan, East Lansing, MI (US); David Ling-Shun Hung, Novi, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 988 days.

(21) Appl. No.: 13/643,508

(22) PCT Filed: Apr. 28, 2011

(86) PCT No.: PCT/US2011/034374
§ 371 (c)(1),
(2), (4) Date: Mar. 27, 2013

(87) PCT Pub. No.: WO2011/137259
PCT Pub. Date: Nov. 3, 2011

(65) Prior Publication Data
US 2013/0199281 A1    Aug. 8, 2013

Related U.S. Application Data

(60) Provisional application No. 61/330,149, filed on Apr. 30, 2010.

(51) Int. Cl.
*H01L 41/08* (2006.01)
*G01M 15/02* (2006.01)
(Continued)

(52) U.S. Cl.
CPC ............... *G01M 15/02* (2013.01); *G01F 1/28* (2013.01); *G01F 1/72* (2013.01)

(58) Field of Classification Search
CPC ............ G01F 1/28; G01F 1/72; G01M 15/02
(Continued)

(56) References Cited

U.S. PATENT DOCUMENTS

| 9,198,563 | B2 * | 12/2015 | Ferren | A61B 1/041 |
| 2003/0214199 | A1 * | 11/2003 | Heim | F04B 35/045 |
| | | | | 310/309 |

(Continued)

FOREIGN PATENT DOCUMENTS

| WO | 2003107523 A1 | 12/2003 |
| WO | 2008076271 A2 | 6/2008 |
| WO | 2011137259 A2 | 11/2011 |
| WO | 2011137259 A3 | 11/2011 |

OTHER PUBLICATIONS

International Application Serial No. PCT/US2011/034374, Search Report and Written Opinion dated Jan. 18, 2012, (10 pgs.).

(Continued)

*Primary Examiner* — Thomas Dougherty
*Assistant Examiner* — Karen B Addison
(74) *Attorney, Agent, or Firm* — Clark IP Law, PLC

(57) ABSTRACT

An apparatus includes an electroactive polymer member and a first electric terminal and a second electric terminal. The electroactive polymer member has a free portion configured to change position relative to a fixed portion in response to an external stimulus corresponding to at least one of a flow parameter or a fluid parameter. The first electric terminal and the second electric terminal are coupled to the electroactive polymer member. The first electric terminal and the second electric terminal provide an electrical signal in response to the change.

25 Claims, 12 Drawing Sheets

(51) Int. Cl.
*G01F 1/28* (2006.01)
*G01F 1/72* (2006.01)

(58) Field of Classification Search
USPC .................................................. 310/800, 328
See application file for complete search history.

(56) References Cited

U.S. PATENT DOCUMENTS

| | | | |
|---|---|---|---|
| 2004/0008853 A1* | 1/2004 | Pelrine | A61M 5/142 381/191 |
| 2004/0025639 A1* | 2/2004 | Shahinpoor | C25D 5/56 75/722 |
| 2005/0116574 A1* | 6/2005 | Neet | H02K 1/165 310/214 |
| 2005/0186116 A1 | 8/2005 | Centanni | |
| 2007/0156211 A1* | 7/2007 | Ferren | A61B 5/0084 607/101 |
| 2009/0131737 A1* | 5/2009 | Ferren | A61B 1/00156 600/12 |
| 2010/0102677 A1 | 4/2010 | Heim et al. | |

OTHER PUBLICATIONS

Ganley, T., et al., "Modeling and Inverse Compensation of Temperature-Dependent Ionic Polymer-Metal Composite Sensor Dynamics", IEEE/ASME Transactions on Mechatronics, 16(1) (Feb. 2011) pp. 80-89.

Ganley, T., et al., "Temperature-Dependent Ionic Polymer-Metal Composite (IPMC) Sensing Dynamics: Modeling and Inverse Compensation", 2010 IEEE/ASME International Conference on Advanced Intelligent Mechatronics (AIM), Montreal, Canada (Jul. 6-9, 2010) pp. 447-452.

Ganley, T., et al., "Characterization and modeling of temperature-dependent behavior of ionic polymer-metal composite sensors", Proceedings of the 16th U.S. National Congress of Theoretical and Applied Mechanics, USNCTAM2010, State College, PA (Jun. 27-Jul. 2, 2010) pp. 1-2.

Hung, D.L.S., et al., "Experimental Studies on Using Ionic Polymer-Metal Composite Materials for Automotive Flow Sensing Applications", Preprints of the 5th IFAC Symposium on Mechatronic Systems, Cambridge, MA (Sep. 13-15, 2010) pp. 399-404.

Hung, D.L.S., et al., "Modeling of Ionic Polymer-Metal Composite Beam Dynamics and its Validation using High-Speed Motion Visualization", 2010 IEEE/ASME International Conference on Advanced Intelligent Mechatronics (AIM), Montreal, Canada (Jul. 6-9, 2010), pp. 175-180.

Zheng, C., et al., "Hybrid IPMC/PVDF Structure for Simultaneous Actuation and Sensing", Smart Structures and Materials 2006: Electroactive Polymer Actuators and Devices (EAPAD), Proceedings of SPIE vol. 6168 (2006) pp. 61681L-1-61681L-9.

Chen et al., "Model-Based Flow Property Estimation Using an Ionic Polymer-Metal Composite Beam", Preprint Submitted to 4th Annual Dynamic Systems and Control Conference, 2011, 8 pages.

* cited by examiner

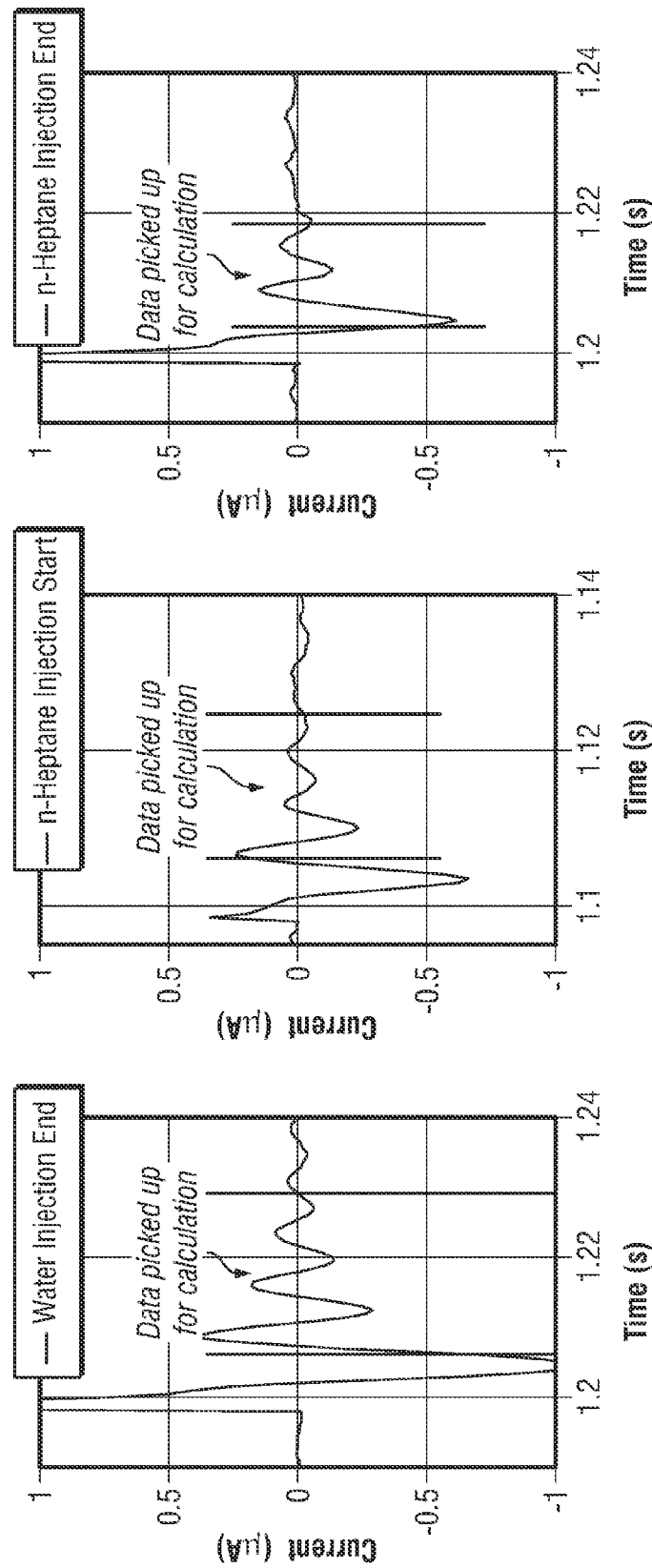

9,903,788 B2

ELECTROACTIVE POLYMER-BASED FLOW SENSOR AND METHODS RELATED THERETO

This application is a U.S. National Stage Filing under 35 U.S.C. 371 from International Application No. PCT/US2011/034374, filed Apr. 28, 2011, and published in English as WO 2011/137259A2 on Nov. 3, 2011, which claims the benefit under 35 U.S.C. 119 (e) of U.S. Provisional Application Ser. No. 61/330,149 filed on Apr. 30, 2010, which applications and publications are hereby incorporated by reference in their entireties.

STATEMENT REGARDING FEDERALLY SPONSORED RESEARCH OR DEVELOPMENT

This invention was made with government support under Grant No. 0547131 from the National Science Foundation and Grant No. N000140810640 from the Office of Naval Research. The Government has certain rights in this invention.

BACKGROUND

Accurate measurements of air and fuel flows of automobile engines are critical because they govern the fuel-air mixing processes in the combustion chamber that could directly impact the combustion efficiency and exhaust emissions.

A traditional flow sensor may be unsatisfactory for certain applications. For example, a calibration error can lead to inaccurate data.

SUMMARY

An apparatus includes at least one electroactive polymer (EAP) member (e.g., an ionic polymer-metal composite (IPMC) beam), with each of EPA members having a first electric terminal and a second electric terminal Each of the at least one EAP members further has a free portion configured to change position relative to a fixed portion in response to an external stimulus corresponding to at least one of a flow parameter or a fluid parameter. The first electric terminal and the second electric terminal are coupled to the EAP member. The first electric terminal and the second electric terminal provide an electrical signal in response to the change.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 16A shows current signal of water at injection start according to an example.

FIG. 16B shows current signal of n-heptane at injection start according to an example.

FIG. 16C shows current signal of n-heptane at injection end according to an example.

DETAILED DESCRIPTION

Figure 1:
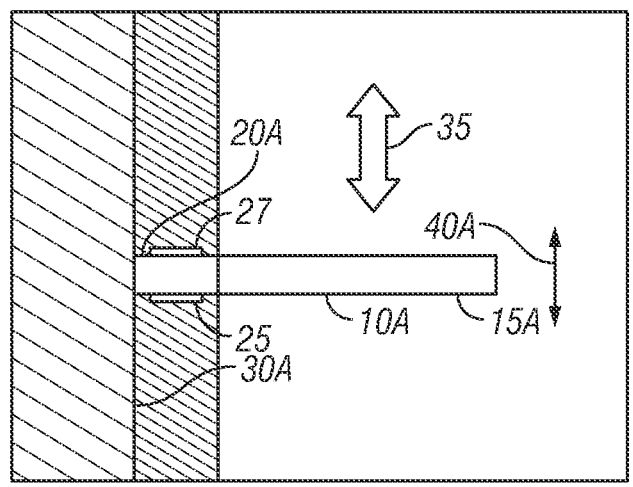
FIG. 1 illustrates a schematic of a beam sensor according to an example.

An example of the present subject matter can be configured for use as a sensor of flow characteristics and/or fluid characteristics. As used herein, the term "fluid" is intended to refer to a substance which can continually deform or flow under an applied shear stress. A fluid can therefore include a material in a liquid or gaseous state.

Flow characteristics (or properties) can include flow rate, pressure, duty cycle, or duration. Fluid characteristics (or properties) can include density, viscosity (liquid state), or temperature. As a flow sensor, the present subject matter can be configured to monitor flow of a fluid medium within a flow channel, such as a lumen, or configured to monitor flow relative to another structure, such as air flow over a surface of an aircraft or a rotating body (turbine).

The sensor can include a member fabricated of an electroactive polymer (EAP). For example, a conjugated polymer, dielectric elastomer, or an ionic polymer-metal composite (IPMC) can be used as part of the sensing element. In one example, the sensor includes a piezoelectric polymer or other material, such as a polyvinylidene fluoride (PVDF).

Two or more electrical terminals (electrodes) can be coupled to the sensor to provide an electrical signal corresponding to a detected physical change in the member. The electrodes can be affixed to a common side of the member or to different (or opposing) sides of the member. For example, two electrodes can be attached on the two sides of an IPMC member, respectively. In one example, each surface of the IPMC member is conductive and an electrode layer of the IPMC member can be patterned to provide multiple outputs from the member.

The member can be configured as a beam or other form. For example, movement of a free portion of the member can be measured relative to a fixed portion of the member. The fixed portion of the member is attached to a substrate or other relatively stationary structure.

In various examples, the member includes a single cantilevered beam having one portion fixed (or securely clamped) or a double cantilevered beam having opposing ends fixed and a center portion allowed to move freely. For instance, the member can include a flag-shaped portion or a round center portion. The perimeter of a round member can be fixed and the central portion can be free to move. In one example, the central portion is fixed and the perimeter is free to move. More complex-shaped members can also be used including plates or membranes.

In one example, an algorithm can be executed to "invert" the sensor dynamics to infer information on deformation. The algorithm can include computation elements to allow modeling of the flow sensor in order to compensate for temperature-dependent behavior of the sensor.

In one embodiment, an electroactive polymer (EAP) member in the form of a cantilever beam, such as an ionic polymer-metal composite (IPMC) cantilever beam (hereinafter "IPMC beam") is used for sensing characteristics of the surrounding fluid medium, such as temperature. The temperature-dependent dynamics of an IPMC beam can be experimentally characterized and modeled. The IPMC beam can be submersed in a surrounding fluid medium comprising a water bath, the temperature of which can be regulated. The empirical frequency response of the sensor, with the tip displacement as input, and the short-circuit sensing current as output, shows dependence on temperature of the surrounding fluid medium. The sensing dynamics can be modeled with a transfer function with temperature-dependent coefficients. By fitting the values of the coefficients to a set of test temperatures, the temperature-dependence of coefficients of a polynomial function can be determined The model can be used in predicting the sensing behavior at various temperatures.

Figure 7A:
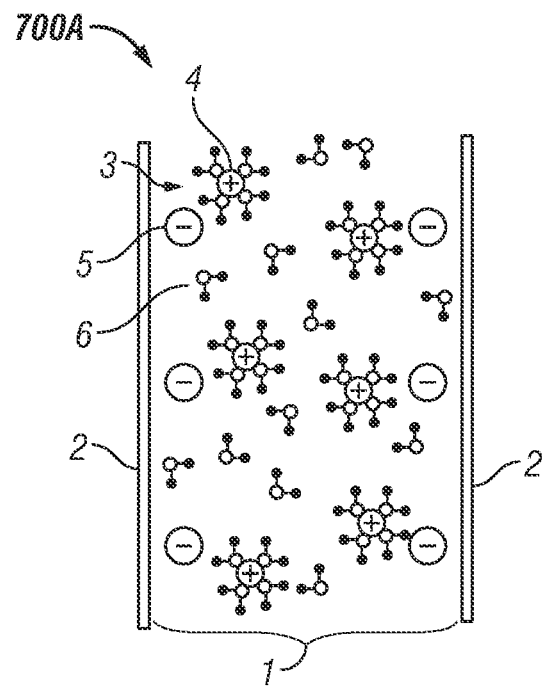
FIGS. 7A and 7B illustrate a sensing principle according to an example.
Figure 7B:
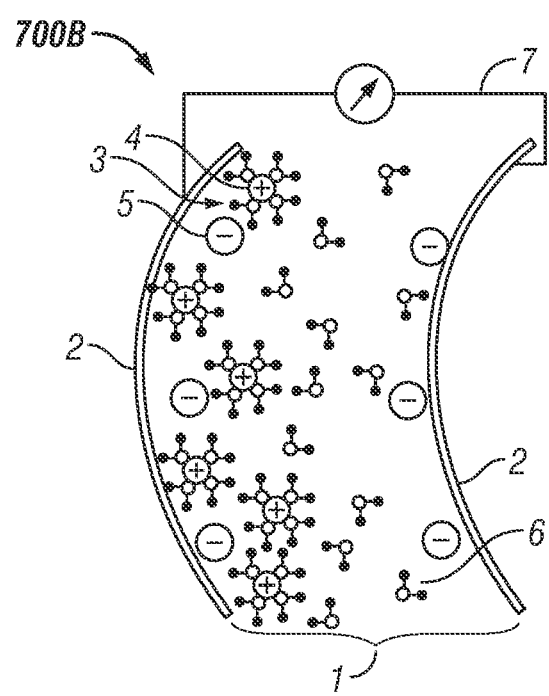

As described herein, in one embodiment, an IPMC beam can be used for sensing with applied mechanical stimulus causing redistribution of the ions inside an IPMC beam, resulting in a detectable electrical signal and thus the sensing effect (See FIGS. 7A and 7B). An example of the present subject matter considers the dependence of the IPMC beam sensing dynamics on the temperature. Accounting for such dependence, however, can be used to improve the accuracy of interpretation of the IPMC beam sensor output in various applications.

Testing for characterizing IPMC beam sensor dynamics at different temperatures was completed in which a (cantilevered) IPMC beam, with length 18 mm, width 6.5 mm, and thickness 0.21 mm, was soaked in a water bath sitting on a digital hotplate (Thermo Scientific, HP131225), which was feedback-controlled using a T-type thermal couple (Omega, HTTC36-T-116G-6) with an accuracy of 0.5° C. The IPMC sample was fabricated in-house, using Nafion®-117 (DuPont) as the raw material. For mechanical excitation, the tip of the IPMC beam was inserted into a slit cut in a wooden piece about 10 cm by 1 cm in size, which was mechanically coupled to the center of the membrane of a subwoofer speaker (Polk/MOMO, MM2154). The speaker was driven by a power amplifier (Biamp Systems, MPA-250). A voltage applied to the speaker induced vibration of the membrane and thus the prescribed tip displacement of the IPMC beam at the order of a few millimeters. A laser sensor (Baumer Electric, OADM 2016441/S14F) was used to measure the actual tip displacement. The short-circuit current measured with a current-amplifier circuit consisting of two cascaded operational amplifiers between the two electrodes of the IPMC beam was at the order of 20-100 micro amps. This measurement was then used as the sensor output.

Completed testing revealed various measured time responses at different bath temperatures, such as about 25° C., about 45° C., and about 65° C., although other temperatures, including all ranges there between can be utilized in the various embodiments. Both the gain and the phase shift can vary significantly with temperature. In one example, one sensor exhibited an increased sensor gain with the temperature within a frequency range of about 40 to about 60 Hz, with the trend reversing outside this range. The phase lag was shown to decrease with an increasing temperature. A physical explanation of the observed trend cannot be readily provided since the sensing dynamics depend on a number of physical factors (such as diffusivity, resistivity, and dielectric constant). Additionally, and while not wishing to be bound by this proposed theory, it is possible that temperature of the water baths may have influenced each of these factors in a complex way.

In one embodiment an empirical model comprising a fourth-order transfer function G(s) is adopted to approximate the measured time response for IPMC beam sensors, according to the following mathematical formula:)

$$G(s) = \frac{b_4 s^4 + b_3 s^3 + b_2 s^2 + b_1 s + b_0}{s^4 + a_3 s^3 + a_2 s^2 + a_1 s + a_0}$$

with coefficients $\{a_i\}_{i=0}^3$ and $\{b_i\}_{i=0}^4$ dependent on the surrounding fluid medium temperature. It is desirable to capture such dependence with simple functions, so that the model at any temperature (within a selected range) can be obtained. To achieve this result, the coefficients corresponding to a set of temperatures are identified. Thereafter, through curve-fitting, low-order polynomial functions of the temperature "T" for individual coefficients can be obtained. The effectiveness of the modeling approach can be established by comparing the measured and predicted frequency responses at temperatures (e.g., 35° C. and 45° C.) that were not used in the data-fitting process. The model can also be validated in free, damped oscillations. Additional details of this multi-link dynamic modeling can be found in FIGS. 9A and 9B discussed below and in D. Hung, X. Yang, G. Zhu, T. Ganely, X. and Tan, "Experimental Studies on Using Ionic Polymer-Metal Composite Materials for Automotive Flow Sensing Applications," published in the proceedings of the 5th IFAC Symposium on Mechatronic Systems, Cambridge, Mass., September, 2010 (hereinafter "Hung Paper"), which is hereby incorporated by reference in its entirety herein.

Figure 10:
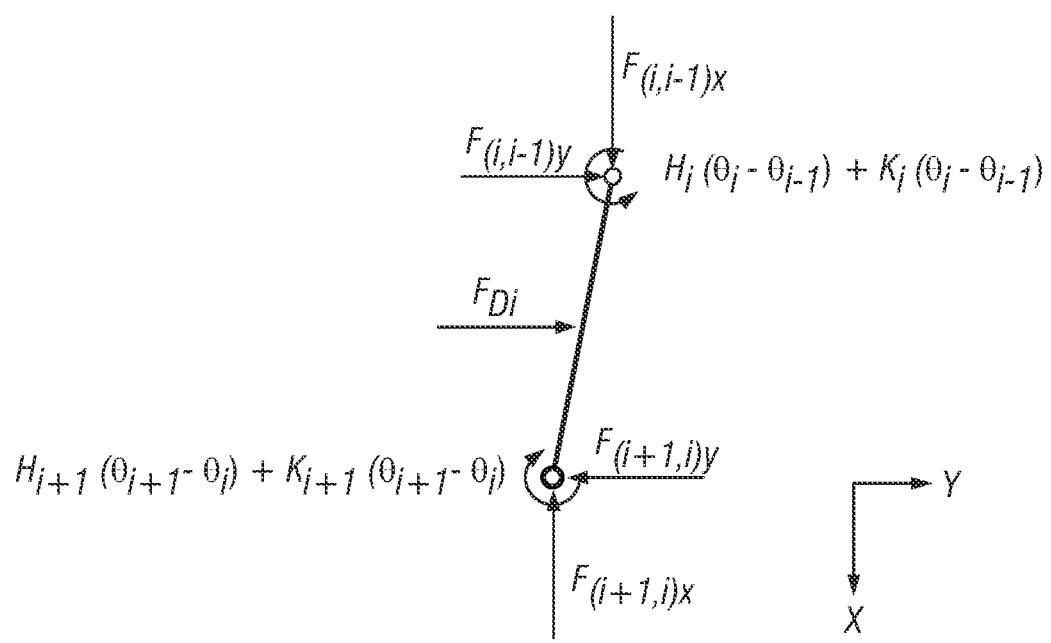
FIG. 10 illustrates a free body diagram of the ith beam element of the beam of FIGS. 9A and 9B according to an example.

It is also possible to model the drag force ($F_{di}$) produced by the surrounding fluid medium as a concentrated load applied at the gravity center of each element, with its direction determined by the flow direction of the surrounding fluid medium. (See FIG. 10 and the Example).

A model of the motion can be established using high speed photographic techniques for the IPMC beam vibrating in air and water (stagnant). The sensor output can include an open-circuit voltage or a short-circuit current and can be expressed as a function of tip displacement for the beam.

In one example, the IPMC beam has a length of between about 10 mm and about 30 mm In one example, the IPMC beam can be modeled in three dimensions in which the IPMC beam width can be monitored for torsional bending.

Opportunities to improve vehicle fuel economy and reduce emissions depend on improved sensors. A beam sensor as described herein can be used to control and monitor power train (ignition, fuelling and mass air flow), and thus improve fuel economy and reduce the emissions. For instance, precise metering of the air and fuel (including any type of biofuel, such as ethanol, E85, other alcohol blends, biodiesel, and the like) entering into the combustion chamber can affect the combustion efficiency and exhaust emissions (including hydrocarbon) during engine cold-start and warm-up conditions.

Traditional sensors are inadequate because they exhibit slow response time and typically provide only low-pass filtered data compiled over many engine cycles. In an automotive application, the engine operating conditions change rapidly.

The nature of cycle-by-cycle engine combustion can lead to cycle-to-cycle pulsating fuel flow. According to one example of the present subject matter, a beam sensor provides good calibration to ensure a proper fuel-air ratio and further provides real-time monitoring of fuel metering for each individual cylinder. An example of the present subject matter provides direct mechano-electrical transduction, flexibility (able to measure low-speed flow), lightweight, low cost and compact size.

FIG. 1 illustrates a schematic of a sensor having an electroactive polymer (EAP) member 10A according to one example. The EAP member 10A includes a free portion 15A and a fixed portion 20A. In this example, the EAP member 10A is configured as a cantilever (beam) with the free portion 15A capable of moving relative to the fixed portion 20A. Electrodes 25 and 27 are coupled to surfaces of the EAP member 1 OA and provide an electrical signal based on movement or deflection of the EAP member 10A.

The EAP member 10A is responsive to a fluid medium as well as to the flow properties of the fluid medium, represented by arrow 35. Both the flow properties and the fluid medium can act on the EAP member 10A and cause deflection, as indicated by arrow 40A.

An aspect ratio for a beam can be defined as a ratio of the beam length to beam width. In FIG. 1, the EAP member 10A has a length that is greater than the width and in one embodiment, the aspect ratio is greater than two. A high aspect ratio may exhibit greater sensitivity. Also as shown in FIG. 1, the beam length has an axis that is substantially perpendicular to the flow direction. The thickness of the beam (measured in a dimension substantially perpendicular to the width) can be uniform or non-uniform. For example, the thickness can be tailored to correspond with non-uniform flow within the cross-section of a flow channel.

The EAP member 10A can be configured to provide an output signal corresponding to static deflection or a dynamic frequency response.

Figure 2:
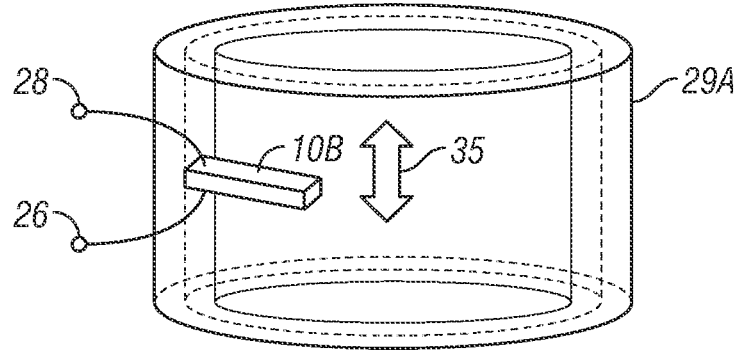
FIG. 2 illustrates a beam sensor in a flow channel according to an example.

FIG. 2 illustrates a flow sensor having an EAP member 10B disposed within a flow channel 29A according to one example. The flow channel 29A can carry a fluid (such as a liquid or a gas) in direction denoted by arrow 35. The EAP member 10B is electrically coupled by electrodes terminating at nodes 28 and 26.

The flow channel 29A can be configured for installation in a hydraulic system, a fuel system, an airway, a pneumatic line, a biological channel (such as an arterial system) or other fluid carrying conduit. The EAP member 10B, as with EAP member 10A, illustrates a cantilevered element.

Figure 3:
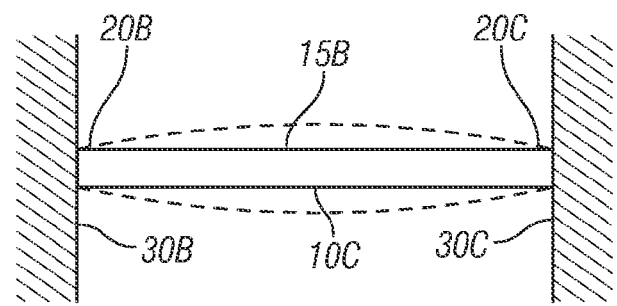
FIG. 3 illustrates a beam sensor according to an example.

FIG. 3 illustrates a sensor having an EAP member 10C suspended between two endpoints. In particular, the EAP member 10C includes a free portion 15B suspended between a fixed portion 20B and a fixed portion 20C. Fixed portions 20B and 20C, respectively, are rigidly coupled to structure 30B and 30C, respectively, leaving the free portion 15B free to oscillate.

Figure 4:
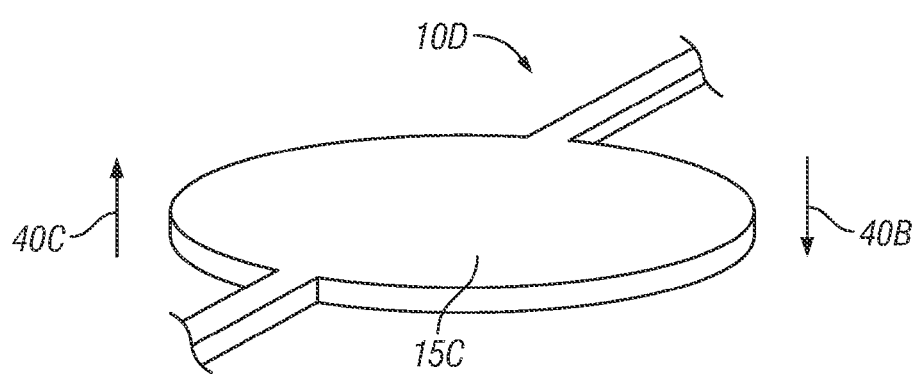
FIG. 4 illustrates a beam sensor according to an example.

FIG. 4 illustrates a sensor having a central disk-shaped portion with an EAP member 10D, having a free portion 15C. The free portion 15C is circular and, in this example, is free to oscillate in an upwardly or downwardly direction and/or twist in a torsional manner, as depicted by opposing arrows 40B and 40C. The EAP member 10D can also move in a complex manner, depending on flow detected relative to the free portion 15C.

Figure 5:
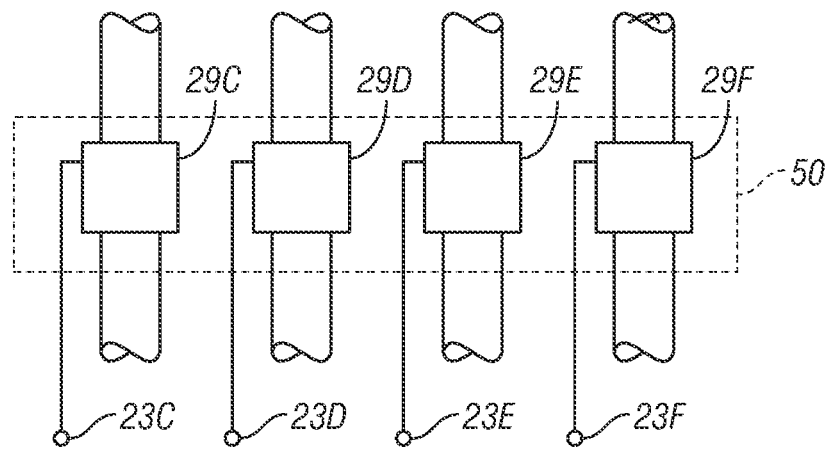
FIG. 5 illustrates a beam sensor system according to an example.

FIG. 5 illustrates a sensor system 50 according to one example. The sensor system 50, in the example shown, includes an array of four sensors and a corresponding number of electrical connections for those sensors. In particular, the sensor system 50 can be configured for use in a four-cylinder engine. In this embodiment, sensors 29C, 29D, 29E, and 29F are coupled to electrical nodes 23C, 23D, 23E, and 23F, respectively.

Figure 6:
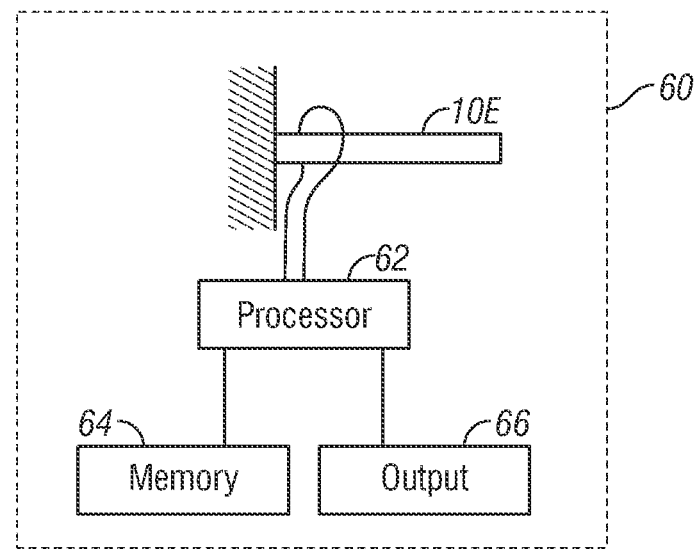
FIG. 6 illustrates a model of a sensor system according to an example.

FIG. 6 illustrates a model of a sensor system 60, according to one example. The sensor system 60 includes a single EAP member 10E, although more than one EAP member is also possible. In this embodiment, the EAP member 10E is electrically coupled to a processor 62. The processor 62 executes instructions stored in memory 64 and generates data for storage in the memory 64. In addition, the processor 62 is coupled to an output 66, which can include, but is not limited to, a printer, a display, a server, a transceiver, or other output device.

An example of two different states of an IPMC member, 700A and 700B, is illustrated in FIGS. 7A (without deformation) and 7B (under deformation), respectively. As shown, the IPMC without and with deformation (700A and 700B respectively), has a polymer layer 1 sandwiched by outer metal surface layers (electrodes) 2. In one embodiment, the polymer layer 1 is an ion-exchange polymer membrane (e.g., Nafion®) containing hydrated mobile cations 3 having mobile cations 4 therein, fixed anions 5 and mobile (neutral) water molecules 6. Fixed anions 5 within the IPMC member without deformation700A in FIG. 7A and covalently fixed to polymer chains in the polymer layer 1 are substantially balanced by the mobile cations 4 within the hydrated mobile cations 3. In contrast, the IPMC member under deformation 700B, such as a deformation under a mechanical stimulus redistributes the hydrated mobile cations 3 (and thus the mobile cations 4) (as well as the waater molecules 6 to a certain extent), producing a detectable electrical signal 7 correlated with the deformation.

Figure 8:
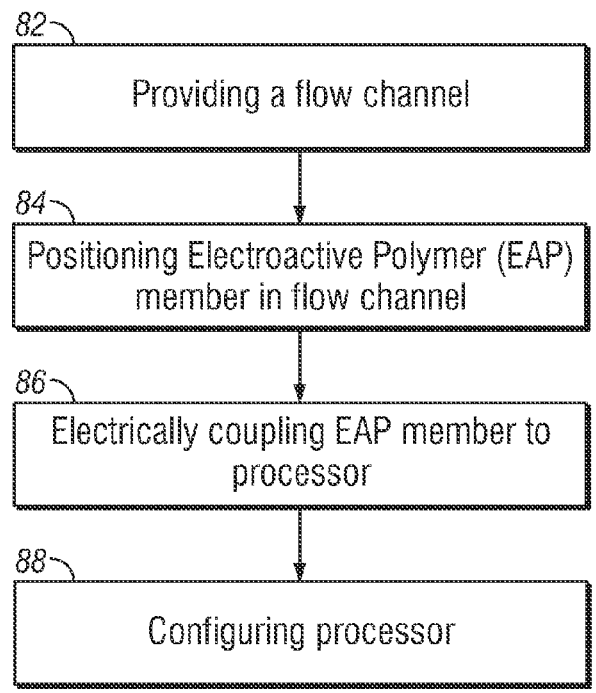
FIG. 8 illustrates a flow chart of a method according to an example.

FIG. 8 illustrates a flow chart of a method 80 according to one example. Method 80 represents a process for configuring a sensor. At 82, the method includes providing a flow channel. The flow channel can include a lumen or a pathway by which a fluid medium passes a sensor. At 84, the method includes positioning an electroactive polymer (EAP) member in the flow channel. This can include placing a cantilever in a manner in which the member axis is aligned perpendicular to an axis of the flow channel. At 86, the method includes electrically coupling the EAP member to a processor. At 88, the method includes configuring the processor to generate data. Configuring can include calibrating or programming the processor.

An EAP member can provide an electrical signal in response to relatively small motion of the EAP member. The electrical signal from the EAP member will change based on a detected change in oscillation frequency or amplitude. In particular, a large deflection of the member will produce a large electrical signal.

The EAP member can be used to detect a change in the fluid medium. For example, air, water, and fuel each produce a different signal pattern. This difference in signal pattern can be used to identify the fluid medium. In one example, a sensor in a fuel line of a flexible fuel vehicle can provide information to adjust engine performance based on a detected change in the fluid medium. In particular, when the sensor detects that a fuel known as E-85 is passing the member, a first engine parameter can be operative and when the sensor detect that a different fuel is passing the EAP member, then a second engine parameter can be operative. The output signal is distinct for different types of fluid media or flow conditions.

The EAP member can detect a change in fluid medium based on a change in viscosity, density, or other characteristic.

In addition, the EAP member can detect a pressure or temperature of the fluid medium and adjust calibration accordingly. In one example, the EAP member provides a signal for use by the engine control unit (ECU) that is used to adjust engine performance. Other sensors can also be integrated with the EAP member of the present subject matter in a system for operating an engine.

The present subject matter can be used to provide near real time data as to the fluid medium or flow characteristics. In particular, the sensor output is nearly instantaneous with a change detected by the EAP member.

The present subject matter can be configured to provide a signal based on a property of the surrounding fluid medium. This can include, for example, density or viscosity. In addition, the present subject matter can be configured to provide a signal based on a flow property. This can include, for example, a pulsation (duty cycle), turbulence, direction of flow, or other operational characteristic.

The EAP member can be configured to respond to a flow of a surrounding fluid medium confined to a lumen in a flow channel or flow of a fluid over a surface. For example, air flow over an airfoil or surface of an aircraft structure can be monitored using the present subject matter. Various examples can be configured as an angle of attack sensor, an airspeed indicator, a turbulence (laminar flow) detector, a stall detector, or other such sensor in an aircraft system.

Figures 9A, 9B:
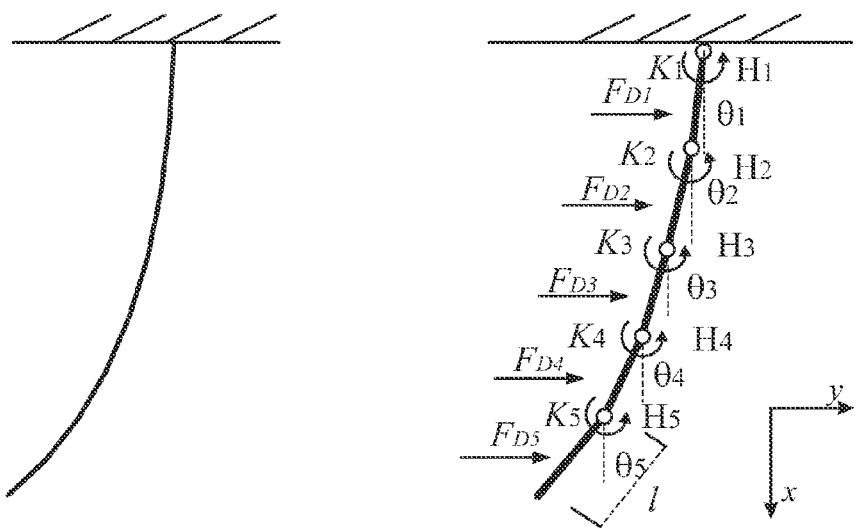
FIG. 9A illustrates a beam according to an example.
FIG. 9B illustrates the beam of FIG. 9A modeled by five rigid elements according to an example.

As noted above, the dynamic response of an EAP member (or beam) can be determined In one embodiment, the dynamic responses of an IPMC beam subject to an evenly distributed external force due to the flow of the surrounding fluid medium can be captured. In this embodiment a full cantilever IPMC beam is discretized into a finite number of rigid-body elements as shown in FIG. 9A. FIG. 9B illustrates an example of discretizing the IPMC beam into five rigid elements. These elements have equal length, with each element linked with its neighbor through the connecting joints. The flexible nature of the material is modeled by using a spring ($K_i$) and a damper ($H_i$) at each connecting joint. The drag force ($F_{Di}$) produced by the surrounding medium can be modeled as a concentrated load applied at the gravity center of each element, and its direction is determined by the flow direction of the fluid.

After discretization, the original cantilever IPMC beam can be converted into a multi-link dynamical system as discussed in the Hung Paper. In one embodiment, a five-element approximation can be used. See, for example, FIG. 10, which shows the free body diagram of one element. For each element, the governing equation can be written in the form as follow, $$J_i \ddot{\theta}_i + H_i(\dot{\theta}_i - \dot{\theta}_{i-1}) + K_i(\theta_i - \theta_{i-1}) - H_{i+1}(\dot{\theta}_{i+1} - \dot{\theta}_i) - K_{i+1}(\theta_{i+1} - \theta_i) = \qquad (1)$$
$$F_{(i,i-1)x}\sin\theta_i \frac{l}{2} + F_{(i,i-1)y}\cos\theta_i \frac{l}{2} + F_{(i+1,i)x}\sin\theta_i \frac{l}{2} + F_{(i+1,i)y}\cos\theta_i \frac{l}{2}$$

wherein l is the length of one beam element. $F_{(i,i-1)x}$, $F_{(i+1,i)x}$, $F_{(i,i-1)y}$, $F_{(i+1,i)y}$ are the reaction forces each on the joint of (i, i−1) and (i+1,i), and they have the following relationship, $$m_i \cdot a_{ix} = F_{(i,i-1)x} - F_{(i+1,i)x} \qquad (2)$$

$$m_i \cdot a_{iy} = F_{Di} + F_{(i,i-1)y} - F_{(i+1,i)y} \qquad (3)$$

wherein $m_i$ is the mass of beam i, $a_{ix}$ and $a_{iy}$ are defined by equations (4) and (5), $$\hat{a}_i = a_{ix}\hat{i} + a_{iy}\hat{j} = \hat{a}_{(i-1,i)} + \ddot{\hat{\theta}}_i \times \frac{\hat{l}}{2} + \dot{\hat{\theta}}_i \times \dot{\hat{\theta}}_i \times \frac{\hat{l}}{2} \qquad (4)$$

$$\hat{a}_{(i-1,i)} = \hat{a}_{(i-2,i-1)} + \ddot{\hat{\theta}}_{i-1} \times \hat{l} + \dot{\hat{\theta}}_{i-1} \times \dot{\hat{\theta}}_{i-1} \times \hat{l} \qquad (5)$$

wherein $\hat{a}_i$ is the acceleration at the mass center of beam i; $\hat{a}_{(i-1,i)}$ is the acceleration at the joint of beam i−1 and beam i. Note the acceleration $\hat{a}_{(0,1)}$ at joint (0, 1) is zero (fixed). The force applied on each element is exerted by the surrounding medium consists of two terms, namely $$F_{Di} = b \cdot l \cdot C_D \cdot \rho \cdot \frac{V^2}{2} + M \cdot \frac{dV}{dt} \qquad (6)$$

wherein the first term is the drag force and the second term is the hydrodynamic force caused by the added-mass effect due to the beam vibration under a fluid medium. Parameters b and c are the beam element width and thickness. Note that $V=V_0+V_i$, wherein $V_0$ is fluid velocity, $V_i=V_{yi} \cos\theta_i + V_{xi}\sin\theta_i$ and $V_{xi}$ and $V_{yi}$ are the tangential and normal components of the element linear velocity at its center of mass, respectively. Assume that angle $\theta_i$ is relatively small, and $V_i$ can be approximated by $V_{yi}$. Also note that $C_D$ in equation (6) is the drag coefficient and $\rho$ is the density of the surrounding medium. M represents the added mass that is being pushed by the beam element, and it can be calculated by $M=\pi\rho b^2 l/4$.

The beam rotational inertial $J_i$, rotational stiffness $K_i$, and the damping coefficient $H_i$ can be calculated from the beam dimensions and the properties of the material, as defined below $$J_i = \frac{m_i \cdot l^2}{12} \qquad (7)$$

$$K_i = \frac{\gamma \cdot b \cdot c^3}{12l} \qquad (8)$$

$$H_i = \xi \cdot 2\sqrt{J_i \cdot K_i} \qquad (9)$$

wherein $\gamma$ is the Young's modulus of the IPMC beam material and $\xi$ is the critical damping ratio of the material. The value of critical damping ratio $\xi$ can be calibrated using the experimental results. Note that, each element can have the same rotational inertial, stiffness, and the damping coefficient.

In order to obtain a linearized model, a small angle assumption can be made such that $$\sin\theta_i \approx 0, \cos\theta_i \approx 1 \quad (10)$$

Additional assumptions which can be made include 1) that the added mass is very small and 2) that the fluid velocity is much larger than that of the beam at the center of the mass. Such assumptions imply that dV/dt is also small, therefore the added mass term can be ignored during the calculation. Based upon the above assumptions, equation (1) can be written in a matrix form as below, $$J\cdot\ddot{\theta}+H\cdot\dot{\theta}+K\cdot\theta=\Gamma \quad (11)$$

wherein J, H, and K are the matrices of moment of inertia, damping coefficient, and stiffness, respectively, and for a five-element case, they are given below $$J = \begin{bmatrix} 52J_i & 42J_i & 30J_i & 18J_i & 6J_i \\ 42J_i & 40J_i & 30J_i & 18J_i & 6J_i \\ 30J_i & 30J_i & 28J_i & 18J_i & 6J_i \\ 18J_i & 18J_i & 18J_i & 16J_i & 6J_i \\ 6J_i & 6J_i & 6J_i & 6J_i & 4J_i \end{bmatrix} \quad (12)$$

$$H = \begin{bmatrix} 2H_i & -H_i & & & \\ -H_i & 2H_i & -H_i & & \\ & -H_i & 2H_i & -H_i & \\ & & -H_i & 2H_i & -H_i \\ & & & -H_i & H_i \end{bmatrix}$$

$$K = \begin{bmatrix} 2K_i & -K_i & & & \\ -K_i & 2K_i & -K_i & & \\ & -K_i & 2K_i & -K_i & \\ & & -K_i & 2K_i & -K_i \\ & & & -K_i & 2K_i \end{bmatrix}$$

$$\theta = \begin{bmatrix} \theta_1 \\ \theta_2 \\ \theta_3 \\ \theta_4 \\ \theta_5 \end{bmatrix}, \Gamma = \frac{1}{2}\begin{bmatrix} F_{D1}+2F_{D2}+2F_{D3}+2F_{D4}+2F_{D5} \\ F_{D2}+2F_{D3}+2F_{D4}+2F_{D5} \\ F_{D3}+2F_{D4}+2F_{D5} \\ F_{D4}+2F_{D5} \\ F_{D5} \end{bmatrix}$$

In one embodiment, a least squares parameter identification is employed. In this embodiment, all the IPMC beam model parameters and fluid flow velocity are assumed to be known, with the only unknown parameters left in equation (6) are $C_D$ and $\rho$. As such, Equation (11) can be rewritten into the following state space form, $$\dot{x}=Ax+Bu, u=V^2C_D\rho$$

$$y=Cx, y=\dot{\theta}_5 \quad (13)$$

wherein $$x = \begin{bmatrix} \theta \\ \dot{\theta} \end{bmatrix}, A = \begin{bmatrix} 0_{5\times5} & I_{5\times5} \\ -J^{-1}\times K_{5\times5} & -J^{-1}\times H_{5\times5} \end{bmatrix}, B = \begin{bmatrix} 0_{5\times5} \\ J^{-1}\times Q_{5\times5} \end{bmatrix},$$

and $$C=[0_{1\times9}\,1];$$

also $I_{5\times5}$ is an identity matrix and $$Q_{5\times5} = \frac{bl^2}{2}\begin{bmatrix} 1/2 & 1 & 1 & 1 & 1 \\ 0 & 1/2 & 1 & 1 & 1 \\ 0 & 0 & 1/2 & 1 & 1 \\ 0 & 0 & 0 & 1/2 & 1 \\ 0 & 0 & 0 & 0 & 1/2 \end{bmatrix}, V^2 = \begin{bmatrix} (V_0+V_1)^2 \\ (V_0+V_2)^2 \\ (V_0+V_3)^2 \\ (V_0+V_4)^2 \\ (V_0+V_5)^2 \end{bmatrix}.$$

Note that $\Gamma=C_D\rho V^2Q$. In this embodiment, fluid velocity $V_0$ can be obtained based upon the pressure difference in a tube and other measurement approaches. Therefore, in this embodiment, $V_0$ is assumed to be known. Beam element velocities $V_1$ to $V_5$ at the center of mass and the beam tip velocity $V_{tip}$ are defined below assuming small angle, $$V_1 = l\dot{\theta}_1/2$$

$$V_2 = l\dot{\theta}_1 + l\dot{\theta}_2/2$$

$$V_3 = l\dot{\theta}_1 + l\dot{\theta}_2 + l\dot{\theta}_3/2$$

$$V_4 = l\dot{\theta}_1 + l\dot{\theta}_2 + l\dot{\theta}_3 + l\dot{\theta}_4/2$$

$$V_5 = l\dot{\theta}_1 + l\dot{\theta}_2 + l\dot{\theta}_3 + l\dot{\theta}_4 + l\dot{\theta}_5/2$$

$$V_{tip} = l\dot{\theta}_1 + l\dot{\theta}_2 + l\dot{\theta}_3 + l\dot{\theta}_4 + l\dot{\theta}_5 \quad (5)$$

As mentioned above, the beam short current signal, $i_{short}$, is proportional to the beam tip velocity, $V_{tip}$, namely:

$$V_{tip} = \eta \cdot i_{short} \quad (15)$$

wherein $\eta$ is the proportional gain, which can be determined according to known methods or obtained using experimental data. In one embodiment, the parameter $\eta$ is obtained based on the high speed imaging and the beam short current signal (See also In addition, note that the damping matrix H is proportional to stiffness matrix in equation (11), or H=$\beta$K, where $\beta$ is a scalar. The natural frequencies of each mode in system (11) can be obtained by using Rayleigh damping theory.

Equation (16) shows the system in modal coordinate, $$\ddot{q}+\overline{H}\dot{q}+\overline{K}q=P^T\Gamma \quad (16)$$

wherein q=$P^T\theta$ is the uncoupled coordinates, $\overline{H}=P^THP$ and $\overline{K}=P^TKP$ are transformed damping and stiffness matrices, respectively. The coordinate transformation matrix P=[$P_1\ P_2\ P_3\ P_4\ P_5$] consists of five system mode shapes, $P_i$(i=1,2, . . . ,5). Since the force applied to each beam element is assumed to be evenly distributed at the same direction, we assumed that the first mode dominates the beam vibration motion. This can also be observed by the high speed imaging in the Hung Paper. Therefore, the first mode vibration is used for analysis. Note that the first mode shape of:

$$P_1=[P_{11}\ P_{21}\ P_{31}\ P_{41}\ P_{51}]^T \quad (17)$$

is obtained from the coordinate transformation from beam physical coordinate to its modal coordinate. Under this assumption, beam element velocities $V_1$ to $V_5$ can be expressed in terms of the function of beam tip velocity $V_{tip}$ as well as the beam tip angular velocity $\dot{\theta}_5$. Equation (18) provides the detailed solutions.

$$V_1 = \frac{P_{11}/2}{P_{11}+P_{21}+P_{31}+P_{41}+P_{51}} V_{tip} \quad (18)$$

$$V_2 = \frac{P_{11}+P_{21}/2}{P_{11}+P_{21}+P_{31}+P_{41}+P_{51}} V_{tip}$$

$$V_3 = \frac{P_{11}+P_{21}+P_{31}/2}{P_{11}+P_{21}+P_{31}+P_{41}+P_{51}} V_{tip}$$

$$V_4 = \frac{P_{11}+P_{21}+P_{31}+P_{41}/2}{P_{11}+P_{21}+P_{31}+P_{41}+P_{51}} V_{tip}$$

$$V_5 = \frac{P_{11}+P_{21}+P_{31}+P_{41}+P_{51}/2}{P_{11}+P_{21}+P_{31}+P_{41}+P_{51}} V_{tip}$$

$$\dot{\theta}_5 = \frac{P_{51} \cdot V_{tip}}{(P_{11}+P_{21}+P_{31}+P_{41}+P_{51}) \cdot l}$$

The continuous time beam system model (13) was discretized into the following discrete state space model:

$$x(k+1) = \hat{A}x(k) + \hat{B}u(k)$$

$$y(k) = \hat{C}x(k) \quad (19)$$

with a sample step of 0.5 ms. The time response of the discrete model can be written as follows, $$x(k) = \hat{A}^k x(0) + \sum_{j=0}^{k-1} \hat{A}^{k-j-1} \hat{B} V^2(j) C_D \rho$$

$$y(k) = \hat{C}x(k) \quad (20)$$

Let $x_0 = x(0)$ and the following equation can be obtained based upon equation (20)

$$\bar{y} = \begin{bmatrix} y(1) \\ y(2) \\ \vdots \\ y(n) \end{bmatrix} \quad (21)$$

$$= \begin{bmatrix} \hat{C}\hat{A}^1 & \hat{C}\hat{A}^0 \hat{B} V^2(0) \\ \hat{C}\hat{A}^2 & \hat{C}\sum_{j=0}^{1} \hat{A}^{1-j} \hat{B} V^2(j) \\ \vdots & \vdots \\ \hat{C}\hat{A}^n & \hat{C}\sum_{j=0}^{n-1} \hat{A}^{n-j-1} \hat{B} V^2(j) \end{bmatrix} \begin{bmatrix} x_0 \\ C_D \rho \end{bmatrix}$$

$$= \Phi(n) \begin{bmatrix} x_0 \\ C_D \rho \end{bmatrix}$$

Since system matrices $(\hat{A}, \hat{B}, \hat{C})$ are known and velocity vector, $V^2$, defined after equation (13) can be calculated using equations (15) and (18), assuming that the beam electronic current signal is measurable and the fluid speed $V_0$ is known. Therefore matrix $\Phi(n)$ can be obtained based upon the beam current signal. To calculate the fluid property parameter $C_D \rho$, the least squares minimal solution of equation (21) is $$\begin{bmatrix} x_0 \\ C_D \rho \end{bmatrix} = [\Phi^T(n)\Phi(n)]^{-1} \Phi^T(n) \bar{y} \quad (22)$$

The solution minimizes the following cost function $$\left\| \bar{y} - \Phi(n) \begin{bmatrix} x_0 \\ C_D \rho \end{bmatrix} \right\|_2 \quad (23)$$

Then, fluid property parameter $C_D\rho$ can be obtained from equation (22).

Figure 11:
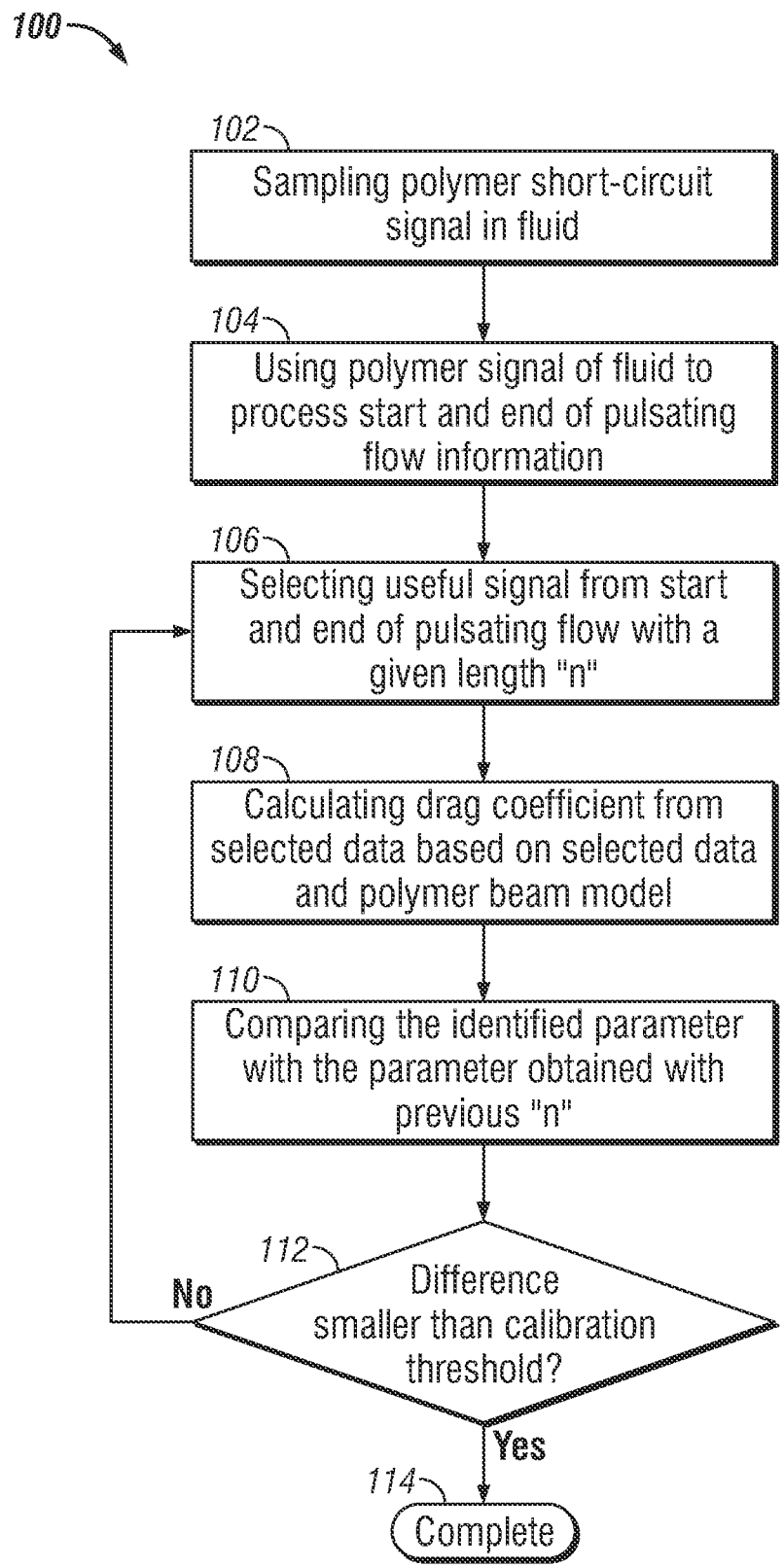
FIG. 11 is a process flow diagram showing an algorithm for converting a polymer signal into flow information according to an example.

In one embodiment, a method comprising converting a polymer signal into flow information is provided. As shown in FIG. 11, the method can comprise sampling 102 a polymer short-circuit signal in fluid and using 104 the polymer (short-circuit) signal of the fluid to process the start and end of pulsating flow information. The next step can comprise selecting 106 a "useful" (short-circuit) signal (i.e., a signal that has a corresponding tip angular movement magnitude of less than about 10 degrees) from start and end of pulsating flow with a given length "n." The method can continue by calculating 108 a drag coefficient based on selected data and a polymer beam model and then comparing 110 the identified parameter with the parameter obtained with previous "n." A determination 112 is then made as to whether or not the difference between the two parameters is smaller than a calibration threshold. If not, the process continues with the selecting step 106 described above. If it is, the process is complete 114, and the flow information obtained can now be used to provide information as a sensor output signal to be used as a feedback signal for a control system. If the fuel blend content of E85 and gasoline is detected, it can be used to adjust the fuel injection quantity to regulate the engine air-to-fuel ratio accurately.

Embodiments of the invention will be further described by reference to the following examples, which are offered to further illustrate various embodiments of the present invention. It should be understood, however, that many variations and modifications may be made while remaining within the scope of the present invention.

EXAMPLE 1

Figure 12:
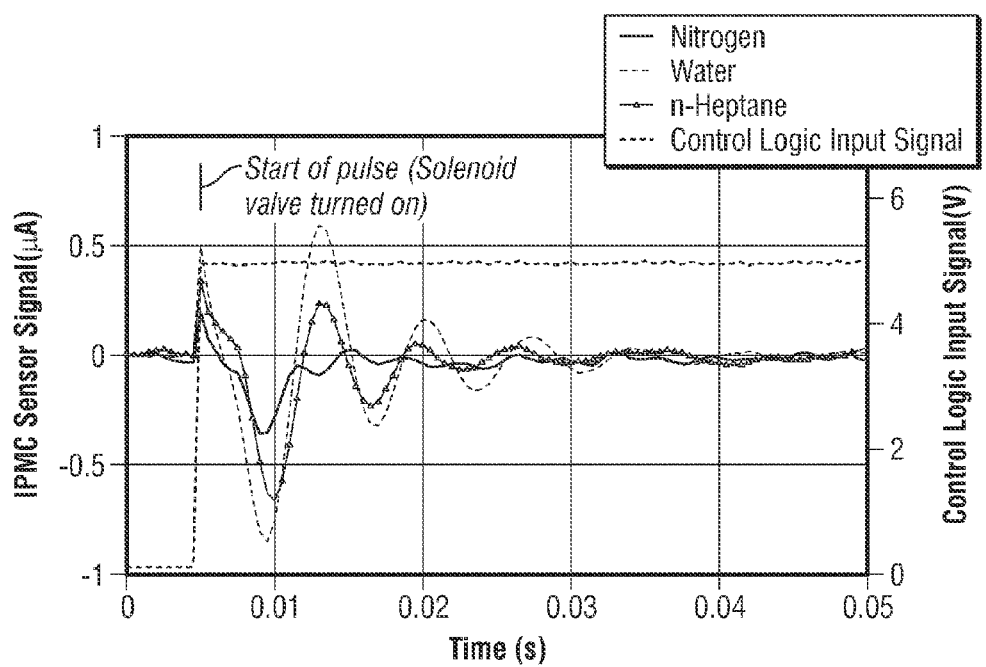
FIG. 12 shows beam sensor responses after a flow pulse start according to an example.
Figure 13:
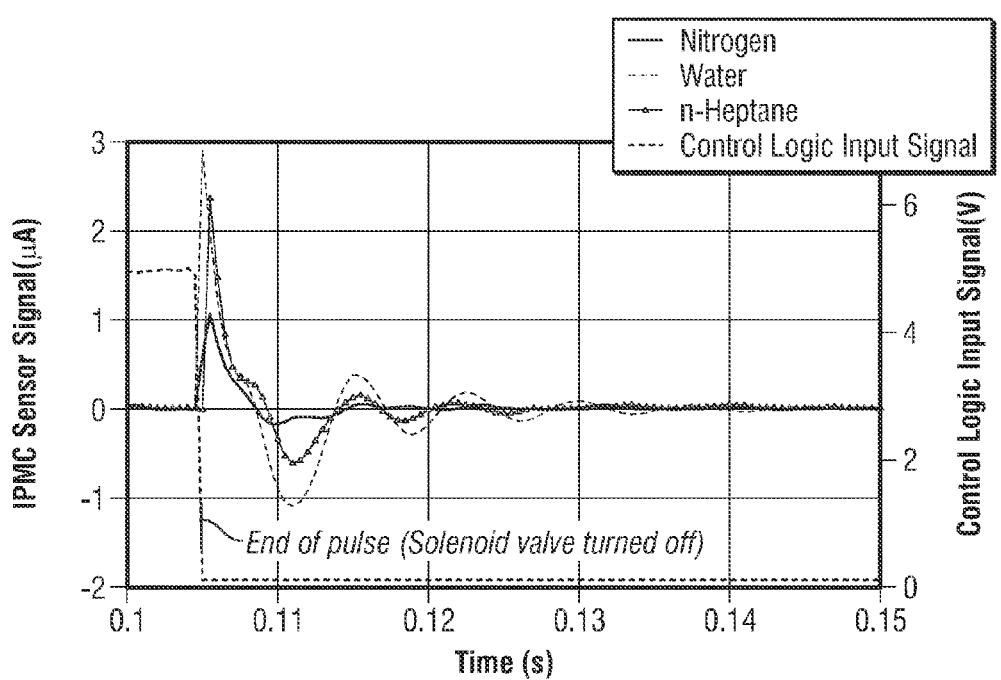
FIG. 13 shows beam sensor responses after a flow pulse end according to an example.

In this example, fluid property parameter, $C_D\rho$, of the IPMC beam submerged in a fluid tube was calculated based upon the electronic signals of two fluid media, namely, distilled water and n-heptane (a standard test fuel of the straight-chain alkane with the chemical formula $H_3C(CH_2)_5CH_3$ or $C_7H_{16}$), as shown in FIGS. 12 and 13.

Table 1 defines the parameters for the IPMC beam used in this testing. Note that, the beam element length l is ⅕ of the total beam length.

TABLE 1

Parameters for Tested IPMC Beam

| Young's Modulus γ (N/mm²) | Material damping ratio ξ | Density $\rho_{beam}$ (g/mm³) | Current $i_{short}$ and $V_{tip}$ Proportion Gain η (m/s/μA) | Length l (mm) | Width b (mm) | Thickness c (mm) |
|---|---|---|---|---|---|---|
| 500 | 0.14 | 3 | 0.22 | 2 | 4 | 0.25 |

Table 2 provides the properties of the two fluids (water and n-heptane), as well as their measured average velocity. The Reynolds number, $R_e$, of the two fluids is obtained by solving the following equation:

$$R_e = \frac{V_0 b}{v}$$

(See, M. Potter and D. Wiggert, 1997, Mechanics of Fluid, 2$^{nd}$ ed., Prentice Hall, pp. 339-343 (hereinafter "Potter Reference"). Based upon the obtained Reynolds number, the actual drag coefficient $C_D$ can be found using the table in the Potter Reference. Note that the obtained drag coefficient assumes that the actual beam shape is a round cylinder. Considering the beam is rectangular, an interval value is given in Table 2. Next, the drag coefficient was calculated based upon the data for different liquids.

TABLE 2

Parameters for Tested Liquid

| Liquid | Density $\rho$ (g/mm³) | Kinematic viscosity $\upsilon$ (mPa · s) | Average velocity $V_0$ (m/s) | Reynolds number $R_e$ | Drag coefficient $C_D$ |
| --- | --- | --- | --- | --- | --- |
| Water | 1 | $1.007 * 10^{-6}$ | 0.15 | 595.8 | 1.1 to 1.3 |
| n-heptane | 0.684 | $0.5643 * 10^{-6}$ | 0.22 | 1583.4 | 0.8 to 1 |

Figure 14:
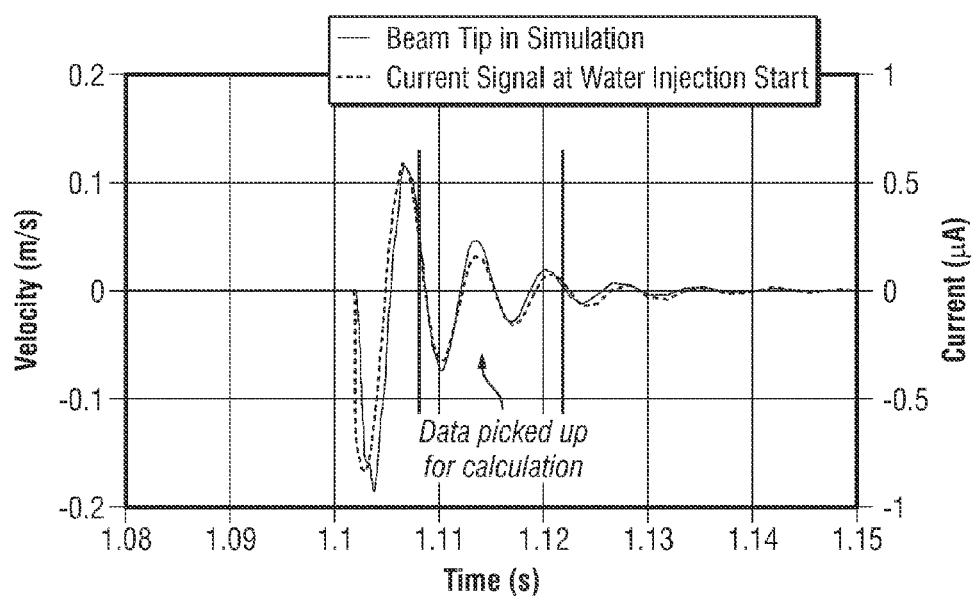
FIG. 14 shows data selection for water at injection start according to an example.

The data shown in FIGS. 12 and 13 was used to estimate the fluid property $C_D\rho$ of water and n-heptane. Note that parameter n, defined in equation (21) (above), affects the accuracy of the least squares estimation. Using the water test data of FIG. 12 and referring now to FIG. 14, the beam current signal under water at the start of pulse flow, and its corresponding beam tip velocity obtained through simulation can be seen. Due to the nonlinearity at the start of pulse flow, the beam current signal cannot match with the simulated beam tip velocity. The linear model also assumes a small displacement angle of the IPMC beam. Therefore, in order to precisely extract the fluid property, the current signal used for parameter estimation is small. Since the sensor transfer function between the current signal and tip displacement angle is known, beam tip angle displacement is configured to be less than 10 degrees. FIG. 14 shows the signal range selected for parameter estimation, where the current signal matches with the simulation beam tip velocity well.

Figure 15:
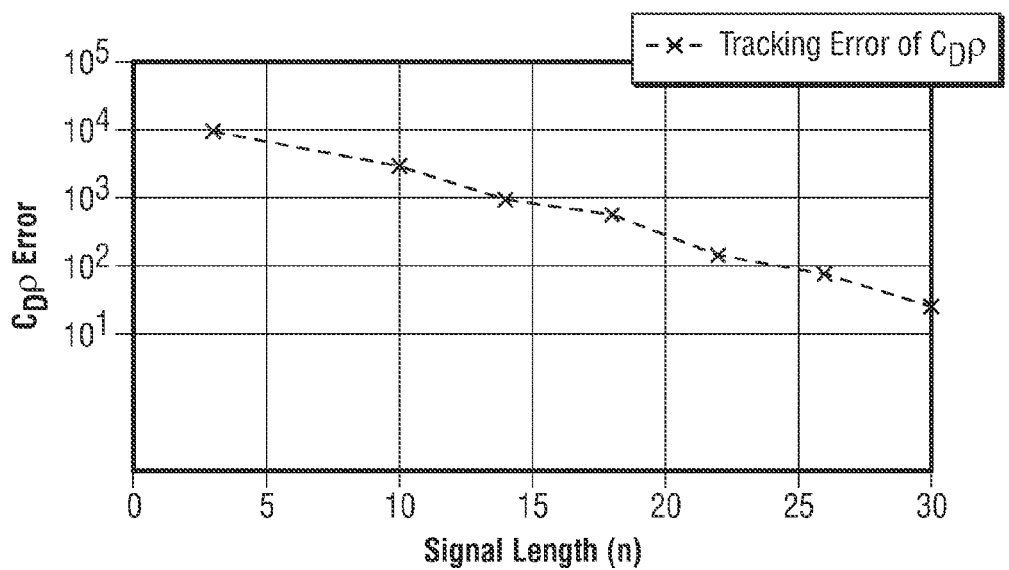
FIG. 15 shows a tracking error of the identified result of water at injection start according to an example.

FIG. 15 illustrates the estimation error in terms of the signal length n. The estimation error is respect to the final identified value of $C_D\rho$ shown in Table 3. The estimation error reduces as the signal length increases because the estimation method is mainly dependent of the beam composite damping (beam and fluid damping), which requires certain signal length to be estimated precisely. FIGS. 16A, 16B and 16C show the selected data regions of the other three cases, with the final estimation results were summarized in Table 3.

TABLE 3

Minimal Least Squares Solution

| Injection | Fluid | Predicted Value $C_D\rho$ | Identified $C_D\rho$ |
| --- | --- | --- | --- |
| Start | Water | 1100-1300 | 1103.7 |
| End | Water | 1100-1300 | 1137.0 |
| Start | n-Heptane | 547.2-684 | 1377.3 |
| End | n-Heptane | 547.2-684 | 613.2 |

The predicted value (obtained based upon the beam and fluid medium physical properties) for $C_D\rho$ was calculated based on the data in Table 2, with the identified $C_D\rho$ obtained using the data together with the proposed least squares approach. The result shows that the significant deviation between the predicted value shown in Table 3 and estimated $C_D\rho$ is from n-heptane data at the start of the pulse flow. The remaining results in Table 3 show that the estimated values are close to their corresponding predicted values. The error of the n-heptane suggests that the IPMC beam has different behavior under n-heptane from water, although this preliminary conclusion cannot be confirmed without further testing. These results also suggest using the end of pulse flow data for parameter estimation.

EXAMPLE 2

Prophetic

Future testing will determine possible differences in behavior of beam sensors, such as an IPMC beam sensor, when exposed to fluid mediums, such as flowing fluid mediums having different viscosities. In addition to various solvents, such as water and n-heptane, a variety of fuels such as alcohol and biodiesel blend may be tested. The beam sensors may also be tested in gaseous fluid mediums. Additional testing will also be performed to confirm possible benefits in using the end of pulse flow data for parameter estimation.

Conclusion

The various embodiments described herein allow, for the first time, estimation of fluid properties, including fluid flow properties, based on the current signal of an electroactive polymer (EAP) member surrounded by the fluid medium using a finite element model. In one embodiment, a five element finite model is used.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third,"

etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A sensor comprising:
an electroactive polymer (EAP) member deformable in response to at least one of a flow characteristic of a fluid medium or a fluid characteristic of the fluid medium; and
first and second electric terminals coupled to the electroactive polymer member and configured to provide a current electrical signal based on deformation of the member, the current electrical signal corresponding to the flow or fluid characteristic.

2. The sensor of claim 1 wherein the electroactive polymer (EAP) member is selected from a conjugated polymer member, a dielectric elastomer member, an ionic polymer-metal composite (IPMC) member, and combinations thereof.

3. The sensor of claim 1 wherein the fluid medium is confined to a flow channel.

4. The sensor of claim 3 wherein the member comprises a single cantilevered beam having a free portion configured to be disposed within the fluid medium and to deform relative to a fixed portion or a double cantilevered beam having opposing ends fixed.

5. The sensor of claim 4 wherein the free portion has a length to width ratio greater than about 2:1.

6. The sensor of claim 4 wherein the flow channel has a flow axis and the free portion has a length aligned substantially perpendicular to the flow axis.

7. The sensor of claim 4 wherein the free portion is substantially circular.

8. The sensor of claim 1 wherein the fluid medium is a liquid medium.

9. The sensor of claim 1 wherein the electroactive polymer member comprises at least one beam.

10. The apparatus of claim 9 wherein said beam has a non-uniform thickness.

11. The sensor of claim 9 wherein the fluid characteristic is selected from density, viscosity and temperature, and the flow characteristic is selected from flow rate, flow type, pressure, duty cycle and duration.

12. The sensor of claim 11 wherein the current electrical signal is a short-circuit current electrical signal.

13. The sensor of claim 12 wherein the flow type is a pulsating flow having a start and an end and the short-circuit current electrical signal provides information on the pulsating flow by using a linear model.

14. The sensor of claim 12 comprising one beam, wherein the short-circuit current electrical signal has a corresponding tip angular movement magnitude of less than 10 degrees from the start to the end of the pulsating flow for a given beam length.

15. The sensor of claim 1 wherein the first electric terminal is coupled to a first surface of the electroactive polymer member and the second electric terminal is coupled to an opposing second surface of the electroactive polymer member.

16. The sensor of claim 1 wherein the fluid medium is a fuel.

17. The sensor of claim 16 wherein the fuel is a gaseous fuel or a liquid fuel.

18. A method comprising:
allowing a sensor comprising an electroactive polymer (EAP) member to deform in response to at least one of a flow characteristic of a fluid medium or a fluid characteristic of the fluid medium; and
coupling first and second electric terminals to the electroactive polymer member, wherein the first electric terminal and the second electric terminal are configured to provide a current electrical signal based on deformation of the member, the current electrical signal corresponding to the flow or fluid characteristic.

19. The method of claim 18 further comprising providing the fluid medium.

20. The method of claim 18 wherein the fluid medium is confined to a flow channel.

21. The method of claim 20 wherein the electroactive polymer member comprises at least one beam.

22. The method of claim 21 wherein said beam has a non-uniform thickness corresponding with a non-uniform flow within a cross-section of the flow channel.

23. The sensor of claim 1 wherein the deformation is a change in position which is a stationary displacement of the sensor or a dynamic response of the sensor.

24. The sensor of claim 1 wherein the fluid medium flows relative to another structure.

25. The sensor of claim 24 wherein the structure is a surface or a rotating body.

* * * * *

UNITED STATES PATENT AND TRADEMARK OFFICE
CERTIFICATE OF CORRECTION

PATENT NO. : 9,903,788 B2
APPLICATION NO. : 13/643508
DATED : November 14, 2017
INVENTOR(S) : Guoming G Zhu et al.

Page 1 of 1

It is certified that error appears in the above-identified patent and that said Letters Patent is hereby corrected as shown below:

In the Specification

Column 2/Line 8: Error reads as "ith" and should read as "*ith*"
Column 4/Line 19: Error reads as "formula:)" and should read as "formula:"
Column 4/Line 59: Error read as "30 mm" and should read as "30 mm."
Column 5/Line 29: Error reads as "member 1 OA" and should read as "member 10A"
Column 9/Line 1: Error reads as "Note that, each" and should read as "Note that each"
Column 10/Line 17: Error reads as "defined below assuming small angle," and should read as "defined below (assuming small angle):"
Column 10/Line 33: Error reads as "short current" and should read as "short-circuit current"
Column 10/Lines 39-40: Error reads as "short current signal (See also" and should read as "short-circuit current signal."
Column 12/Line 42: Error reads as "Note that, the" and should read as "Note that the"
Column 13/Line 1: Error reads as "Reference")." and should reads as "Reference"))."

Signed and Sealed this
Twenty-second Day of May, 2018

Andrei Iancu
*Director of the United States Patent and Trademark Office*